2 Sheets—Sheet 1.

F. B. PERKINS.

ELECTRIC ELEVATOR.

No. 11,185. Reissued Aug. 4, 1891.

Witnesses.
Edward F. Allen.
Frederick L. Emery

Inventor:
Francis B. Perkins.
by Crosby & Gregory Attys.

2 Sheets—Sheet 2.

F. B. PERKINS.

ELECTRIC ELEVATOR.

No. 11,185. Reissued Aug. 4, 1891.

Witnesses.
Edward F. Allen
Frederick L. Emery

Inventor:
Francis B. Perkins.
by Crosby & Gregory
Attys.

UNITED STATES PATENT OFFICE.

FRANCIS B. PERKINS, OF BOSTON, MASSACHUSETTS.

ELECTRIC ELEVATOR.

SPECIFICATION forming part of Reissued Letters Patent No. 11,185, dated August 4, 1891.

Original No. 439,180, dated October 28, 1890. Application for reissue filed June 24, 1891. Serial No. 397,361.

*To all whom it may concern:*

Be it known that I, FRANCIS B. PERKINS, of Boston, county of Suffolk, State of Massachusetts, have invented an Improvement in Electric Elevators, of which the following description, in connection with the accompanying drawings, is a specification, like letters and figures on the drawings representing like parts.

This invention relates to elevators of that class known as the "drum-elevator," in which the elevator car or platform is raised by winding the hoisting rope or cable upon a drum set in rotation by means of an electromotor.

My present invention has for its object to provide elevators of the class referred to with an electrically-controlled brake mechanism in circuit with the electromotor and normally operative by the starting and stopping mechanism, as the usual shipper-rope, to release the brake and permit movement of the car as long as the circuit of the said motor is completed, but which becomes inoperative as soon as the circuit of the motor is broken, so that in case of accident to the motor or its circuit the elevator-car cannot be moved by operating the starting mechanism.

The particular features of my invention will be pointed out in the claims at the end of this specification.

Figure 1:
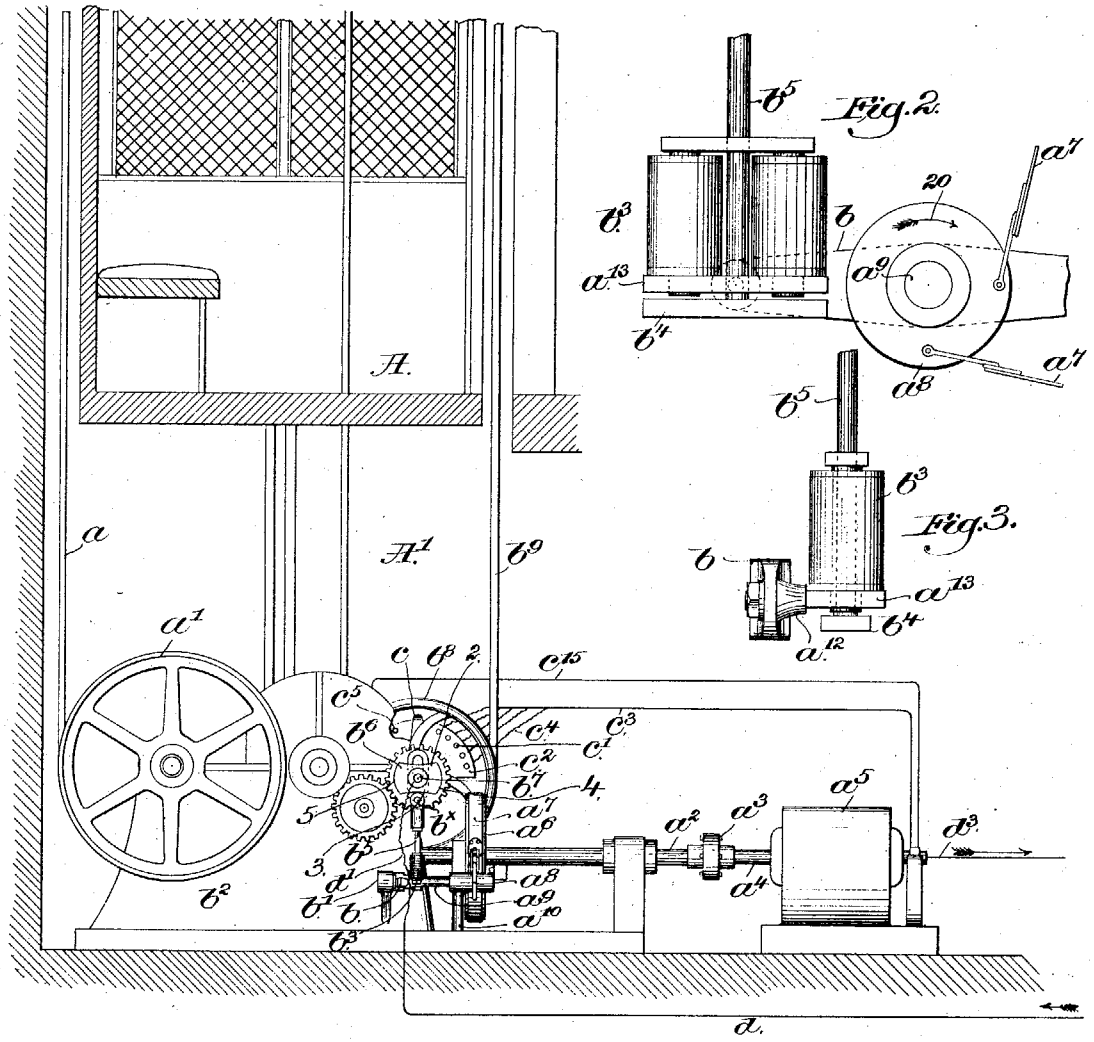

Figure 1 represents a sufficient portion of a drum-elevator mechanism operated by an electromotor to enable my invention to be understood. Fig. 2 is a detail on an enlarged scale of the electrical device for controlling the operation of the brake mechanism; Fig. 3 an end elevation of part of the device shown in Fig. 2, and Fig. 4 a diagram of circuits to more clearly show the operation of the mechanism.

The elevator-car A, suspended in the elevator-well or hoistway A′ by ropes or cables $a$, wound about a drum $a'$, rotated in any usual manner by a worm-shaft $a^2$, joined, as by bolts $a^3$, to the armature-shaft $a^4$ of an electromotor $a^5$, may be of any usual or well-known construction. The rotation of the drum $a'$ is regulated by a brake mechanism (shown as a disk or wheel $a^6$) fast on the worm-shaft $a^2$ and embraced by a strap $a^7$, having its opposite ends secured, as herein shown, to a disk or wheel $a^8$ fast on a shaft $a^9$, having bearings in an upright $a^{10}$. The shaft $a^9$ has fast on it at one end a lever $b$, having secured to it by an arm or bar $a^{12}$ an electro-magnet $b^3$, composed, preferably, of two coils having their armatures $b^4$ secured to a rod $b^5$, herein shown as extended loosely through the pole-pieces of the magnet, having at its upper end, as herein shown, a roller $b^\times$, which is engaged by a cam $b^6$ on the shaft $b^7$, upon which is mounted the usual shipper-wheel $b^8$, about which is passed the usual shipper-rope $b^9$, extended through the car.

The cam $b^6$ is fast on the shipper-shaft $b^7$, and is so shaped that when in one position, as shown in Fig. 1, the rod $b^5$ will occupy its uppermost or normal or inoperative position; but when the said cam occupies a position substantially at right angles to the position shown the rod $b^5$ will be depressed and the brake mechanism operated to loosen the brake $a^7$ to permit the worm-shaft $a^2$ to be revolved, as will be described. The cam $b^6$, as herein shown, is made with two concaved sides 2 3 and two convexed ends 4 5.

The shaft $b^7$ is provided, as shown, with a contact-arm $c$, adapted to be moved over and into engagement with contact studs or points of a resistance box or switch $c^2$, which may be of any usual or well-known construction, the said resistance-box being provided with two sets of contact-studs $c'$ $c^5$, one wire, as the positive wire $c^3$ of the electromotor, being connected to one set of studs $c'$ through the resistance, (see Fig. 4, and which are represented in Fig. 1 by the lines $c^4$,) the other or negative wire $c^{15}$ being connected to the second set of studs $c^5$, the wire $c^3$ being connected to the positive brush 10, and the wire $c^{15}$ being joined to the negative brush 12, so that when the shipper-rope is operated to rotate the shipper-wheel and bring the arm or brush $c$ in contact with the second set of studs $c^5$ the motor-shaft is rotated in the direction opposite to that in which it is rotated when the said arm or brush is brought in contact with the studs $c'$.

Figure 4:
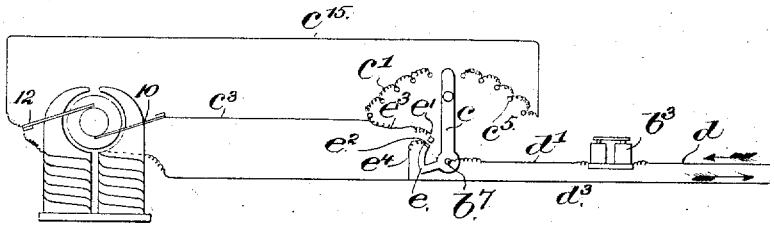

As herein shown, the positive wire $d$ of the main or supply circuit is connected to the electro-magnet $b^3$, and the latter connected by wire $d'$ to the shipper-shaft $b^7$, the negative branch wire $d^3$ being herein shown as connected to one end of the field-magnet coil, the other end of which is joined to the negative brush 12, as shown in Fig. 4.

The arm $c$ is provided, as shown in Fig. 4, with a contact arm or brush $e$, which co-operates with two contacts or terminals $e'$ $e^2$, the terminal $e'$ being connected by wire $e^3$ to the positive wire $c^3$, and the terminal $e^2$ is joined by wire $e^4$ to the wire $d^3$.

When the elevator-car is at rest, the shaft $a^9$ is rocked in the direction indicated by arrow 20, Fig. 2, by a counter-weight, (not shown,) but which is such as commonly used on elevators, the said shaft rotating the disk $a^8$ in the direction indicated by arrow 20 and causing the brake-strap $a^7$ to tighten on its wheel or disk $a^6$, and thus prevent rotation of the motor-shaft.

In operation, the attendant on the car, by means of the shipper-rope, revolves the shipper-wheel $b^8$ and its shaft $b^7$ and brings the contact-arm $c$ into engagement with one set of studs, as $c'$, if it is desired the elevator should ascend, and if the circuit of the motor is complete the electro-magnet $b^3$ will attract its armature and hold it fast to its poles, so that when the cam $b^6$ strikes and depresses the roller $b^\times$ the rod $b^5$ and the electro-magnet will be moved down. The electric current may be traced in Fig. 4 as follows, viz: wire $d$, coils of magnet $b^3$, wire $d'$, contact-arm $c$, resistance $c'$, wire $c^3$, positive brush 10, armature of the motor, negative brush 12, field-magnet coil, and negative wire $d^3$. When the lever $c$ is brought into engagement with the resistance-studs $c'$, the arm or brush $e$ is moved out of contact with the terminal $e'$. When the circuit is completed, the electro-magnet $b^3$ attracts its armature $b^4$ and practically renders the electro-magnet, its armature, and the rod $b^5$ one piece, so that as the electro-magnet is moved down the lever $b$ will be turned in the direction opposite to that indicated by arrow 20, and thus loosen the brake-strap $a^7$ and permit the motor to be set in motion. If now it is desired that the elevator should descend, the operator through the shipper-rope turns the switch-lever into contact with the resistance $c^5$, bringing the brush or arm $e$ into contact with the terminals $e'$ $e^2$ and thus completing the circuit through the motor in the opposite direction and producing opposite rotation of the motor-shaft, the said circuit being traced as follows, viz: wire $d$, magnet $b^3$, wire $d'$, lever $c$, resistance $c^5$, wire $c^{15}$, brush 12, where the current divides, a portion going through the armature, brush 10, wires $c^3$, terminal $e'$, arm $e$, terminal $e^2$, wires $e^4$ and $d^3$, the other path from the brush 12 being through the field-magnets of the motor and wire $d^3$. If any accident should occur to the motor, the circuit of the electro-magnet would not be completed, so that when the shipper-rope was operated and the cam $b^6$ brought to engage with the roller $b^\times$ the rod $b^5$ and the armature $b^4$ alone would be moved, leaving the electro-magnet and the lever $b$ undisturbed, thus maintaining the brake set and rendering the elevator inoperative.

I have herein shown one form of brake mechanism; but I do not desire to limit myself to the particular form shown, as any usual or well-known form of brake mechanism may be used.

I claim—

1. The combination of an elevator mechanism, an electric motor to actuate the same, a starting and stopping mechanism for said elevator mechanism, a brake mechanism, and an electrically-controlled connection connecting the said brake mechanism with said starting and stopping mechanism, whereby the former is made operative by the latter so long as the circuit through said connection is maintained, the said electrically-controlled connection being disconnected or broken as soon as the circuit is interrupted, to thereby prevent the said brake mechanism from being operated by operation of the starting and stopping mechanism, substantially as described.

2. The combination of an elevator mechanism, an electric motor to actuate the same, a starting and stopping mechanism for said elevator mechanism, a brake mechanism, and an electrically-controlled connection in circuit with said electric motor and connecting said brake mechanism and starting and stopping mechanism, whereby the former is made operative by the latter so long as the motor-circuit is maintained, the said electrically-controlled connection being disconnected or broken as soon as the motor-circuit is interrupted, to thereby prevent the said brake mechanism from being operated by operation of the starting and stopping mechanism, substantially as described.

3. The combination of an elevator mechanism, an electric motor to actuate the same, a starting and stopping mechanism, including a shipper-wheel and a shipper-shaft therefor, a brake mechanism, and an electrically-controlled connection between said shipper-shaft and said brake mechanism, whereby the latter is made operative by the former so long as the circuit through said connection is maintained, the said electrically-controlled connection being disconnected or broken as soon as the circuit therethrough is interrupted, to thereby render the said brake mechanism inoperative by operation of said shipper-wheel and shipper-shaft, substantially as described.

4. The combination of an elevator mechanism, an electric motor to actuate the same, a starting and stopping mechanism, including a shipper-wheel and a shipper-shaft therefor, a cam moved by said shaft, a brake mechanism, and an electrically-controlled connection between said cam and said brake mechanism, whereby the latter is made operative by movement of the former so long as the circuit through said connection is maintained, the said electrically-controlled connection being disconnected or broken as soon as the circuit is interrupted, to thereby render the said brake mechanism inoperative by movement of said cam, substantially as described.

5. The combination, with a drum-elevator mechanism, including a worm-shaft, an electric motor having its armature-shaft connected to the said worm-shaft, and a brake mechanism to control rotation of the said shafts, of an electro-magnet connected to said brake mechanism, an armature for said magnet, a rod $b^5$ connected to said armature, a cam $b^6$ to act on said rod, a shaft on which said cam is mounted, a switch lever or arm on said shaft, a resistance-box connected to the motor, and a shipper-wheel and rope, substantially as described.

In testimony whereof I have signed my name to this specification in the presence of two subscribing witnesses.

FRANCIS B. PERKINS.

Witnesses:

FREDERICK L. EMERY,

EMMA J. BENNETT.